United States Patent
Iraschko (10) Patent No.: US 8,424,655 B2
(45) Date of Patent: Apr. 23, 2013

(54) COMPACT COMBINATION CYLINDER FOR VEHICLE BRAKES, COMPRISING A CONTROL DEVICE, AND METHOD FOR CONTROLLING THE BRAKE CYLINDER

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 813 days.

(21) Appl. No.: 12/567,098

(22) Filed: Sep. 25, 2009

(65) Prior Publication Data

US 2010/0075805 A1  Mar. 25, 2010

Related U.S. Application Data (63) Continuation of application No. PCT/EP2008/002364, filed on Mar. 26, 2008.

(30) Foreign Application Priority Data

Mar. 27, 2007 (DE) .................... 10 2007 015 211

(51) Int. Cl.
*B60T 17/08* (2006.01)

(52) U.S. Cl.
USPC .............................. 188/170; 188/265; 303/89

(58) Field of Classification Search ................... 303/89; 188/170, 106 F, 265, 153 D, 166; 92/63, 92/130 A, 130 R, 134
See application file for complete search history.

(56) References Cited

U.S. PATENT DOCUMENTS

| 3,636,822 A | 1/1972 | Horowitz |
| 7,523,999 B2 | 4/2009 | Iraschko |
| 2007/0246313 A1* | 10/2007 | Iraschko ...................... 188/170 |

FOREIGN PATENT DOCUMENTS

| DE | 10 2005 044 708 A1 | 4/2006 |
| GB | 2416010 A * | 1/2006 |
| WO | WO 2006/005898 A1 | 1/2006 |
| WO | WO 2006032446 A1 * | 3/2006 |

OTHER PUBLICATIONS

German Office Action dated Jan. 10, 2008 with English translation (six (6) pages).
International Search Report dated Nov. 12, 2008 with English translation (eight (8) pages).

* cited by examiner

*Primary Examiner* — Robert A Siconolfi
*Assistant Examiner* — Anna Momper
(74) *Attorney, Agent, or Firm* — Crowell & Moring LLP (57) ABSTRACT

A brake cylinder for pneumatic vehicle brakes includes a spring brake section for parking brake actions and a service brake section for service brake actions combined in one housing. The housing is subdivided by a piston into two compartments, one compartment being used as the pressure compartment for the service brake, and the brake spring of the spring section being arranged in the other compartment on the opposite end of the piston. The brake spring acts upon an additional spring piston, which can be locked and released relative to the piston by a pneumatic locking mechanism. The spring piston is connected to a piston rod directly or via additional elements to actuate the brake. Once the locking mechanism is released, the brake spring displaces the pistons relative each other during a parking brake action. At least one pneumatic valve for controlling the brake cylinder are integrated into the brake cylinder.

11 Claims, 6 Drawing Sheets

COMPACT COMBINATION CYLINDER FOR VEHICLE BRAKES, COMPRISING A CONTROL DEVICE, AND METHOD FOR CONTROLLING THE BRAKE CYLINDER

CROSS-REFERENCE TO RELATED APPLICATIONS

This application is a continuation of PCT International Application No. PCT/EP2008/002364, filed Mar. 26, 2008, which claims priority under 35 U.S.C. §119 to German Patent Application No. DE 10 2007 015 211.8, filed Mar. 27, 2007, the entire disclosures of which are herein expressly incorporated by reference.

This application contains subject matter related to U.S. application Ser. No. 12/566,980, entitled "Compact Combined Cylinder Comprising a Manual Release Device;" U.S. application Ser. No. 12/567,080, entitled "Compact Combined Cylinder Comprising a Manual Release Device;" U.S. application Ser. No. 12/566,991, entitled "Brake Cylinder for a Pneumatically Operable Vehicle Brake;" U.S. application Ser. No. 12/567,043, entitled "Compact Combination Brake Cylinder Comprising a Pneumatic Locking Mechanism", now abandoned, and U.S. application Ser. No. 12/567,085, now U.S. Pat. No. 7,987,953, entitled "Compact Combined Brake Cylinder," all filed on even date herewith.

BACKGROUND AND SUMMARY OF THE INVENTION

The invention relates to a brake cylinder for pneumatically actuated vehicle brakes, in particular for commercial vehicles, and to a method for controlling the brake cylinder.

In heavy commercial vehicles, the parking brake is actuated by what are known as spring force accumulator cylinders (spring-loaded cylinders). Here, the brake actuating force is generated via spring force, with the result that the requirements for a mechanically actuated parking brake are satisfied.

Since the spring force accumulator cylinders are, as a rule, designed to generate very high forces, manual release in the operating case is no longer appropriate. In the case of pneumatically actuated brakes, the parking brake is therefore released by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

The most common design is what is known as a combined cylinder. A combined cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part, which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as a compact combined cylinder affords a more compact design. DE 10 2005 044 708 A1 (corresponding to U.S. Pat. No. 7,523,999 B2) discloses a brake cylinder of this type, in which the function of the parking brake cylinder is integrated directly into the service brake cylinder. Here, the spring force accumulator spring is no longer actuated via a separate spring force accumulator piston, but rather likewise via the piston of the service brake cylinder. In order to release the parking brake, the SBS piston is loaded for a short time period by way of a special actuation with compressed air.

As described in the preceding text, the parking brake is released as a rule with the aid of compressed air. In addition, however, it also has to be possible to release the parking brake by a manual operation in the case of a pressure loss.

To this end, in the case of conventional combined cylinders, the spring is pulled back with the aid of a threaded spindle (what is known as the "release spindle"). As a result, the function of the service brake cylinder is not impaired.

This cannot be realized in such a simple way in the case of the compact combined cylinder, since the SBS piston and the spring force accumulator spring are connected to one another. If the spring were pulled back by a threaded spindle which is accessible from the outside, the SBS piston would also be blocked and, as a consequence, the SBS cylinder would no longer function.

A manually actuable release device is therefore advantageous to release the spring force accumulator spring manually, which manually actuable release device makes it possible to cancel the spring force accumulator action in the case of a pressure loss, without impairing the SBS function. Furthermore, it is possible to reestablish the PBS action by a manual operation after the release operation. The release device is also suitable, in particular, for compact combined cylinders which have a threaded spindle with a quick-action thread which is not self-locking. The quick-action thread primarily serves to make it possible to arrest the spring force accumulator spring in what is known as the release position. To this end, the threaded spindle is fixed by way of a pneumatically actuated locking mechanism. When the parking brake is engaged, the locking mechanism is ventilated, as a result of which the threaded spindle can be rotated and the spring force accumulator spring can be relieved. The threaded spindle is preferably also used for manually releasing the spring force accumulator spring. Here, the threaded spindle is set in rotation by an external introduction of force. Since it is a quick-action thread which is not self-locking here, the spindle would be rotated back again immediately, for example, when the wrench is turned and the spring force accumulator spring would therefore start acting again.

For the actuation of a brake cylinder of the generic type, separate elements are required in addition to the customary brake control system, which signifies a disadvantage.

The solution to this problem is the object of the invention.

According to the invention, a brake cylinder and method of operating same are provided for pneumatically actuated vehicle brakes, in particular for commercial vehicles, including a spring force accumulator brake section for carrying out parking brake operations by use of a spring force accumulator spring, and a service brake section for carrying out service brake operations which are actuated by compressed air. The spring force accumulator brake section and the service brake section are combined in a housing to form one structural unit. The housing is divided by a piston into two spaces, of which one of the two spaces serves as pressure space for actuating the service brake section. The spring force accumulator spring of the spring force accumulator section is arranged in the further space on the opposite side of the piston. The spring force accumulator spring acts in the space on a further spring force accumulator piston, which can be locked with respect to the piston by way of a pneumatically actuable locking mechanism and can be released from the locking mechanism by release of the latter, and which is connected directly or via further elements to a piston rod for actuating the vehicle brake. After the release of the locking mechanism, the spring force accumulator spring acts between the two pistons and displaces them relative to one another in the case of a parking brake operation. At least one or more pneumatic valves is integrated into the brake cylinder in order to actuate the brake cylinder.

The required independence can be realized by the integration of all or at least some of the components or elements for the special actuation of the compact combined cylinder.

The invention preferably integrates all the additionally necessary elements directly into the compact brake cylinder. It therefore provides improved cylinder control, which in principle does not require any special valve architecture on the remaining vehicle brake system outside the cylinder, with the result that the known construction of the valve architecture can be retained per se, since all the additional elements are integrated into the cylinder.

The brake cylinder is preferably supplemented merely by purely pneumatic/mechanical elements for actuation, and the use of electronic control components is avoided, in order to ensure functioning which is independent of the vehicle electrical system. It is possible in this way to design the controller such that all the different operating situations can be realized even without a current supply of the cylinder.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
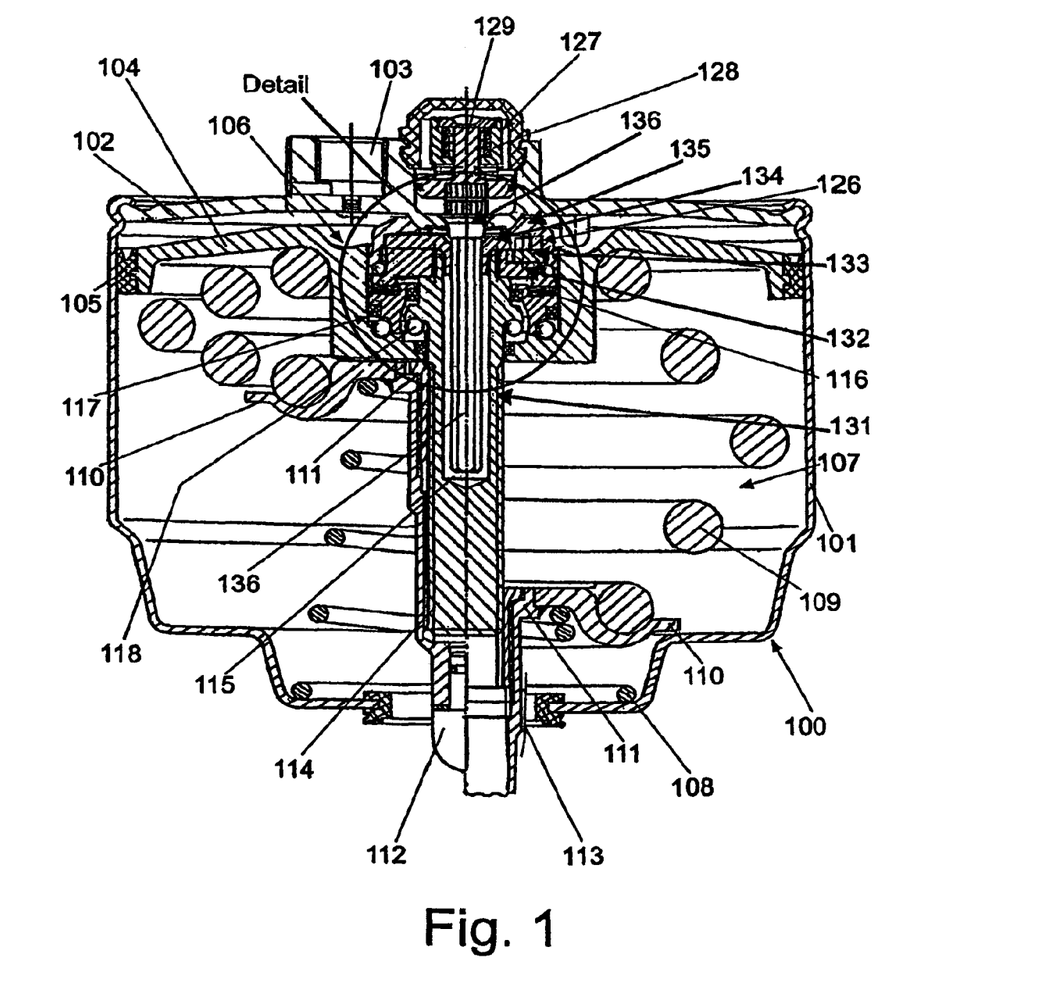
FIG. 1 shows the brake cylinder according to an embodiment of the invention in half section, in the release position (left-side) and in the parking brake position (right-side)

FIG. 1 shows a section through a compact brake cylinder 100 according to an embodiment of the invention, the spring force accumulator being shown in the released position in the left half of the drawing and the spring force accumulator being shown in the engaged position in the right half of the drawing.

Figure 2:
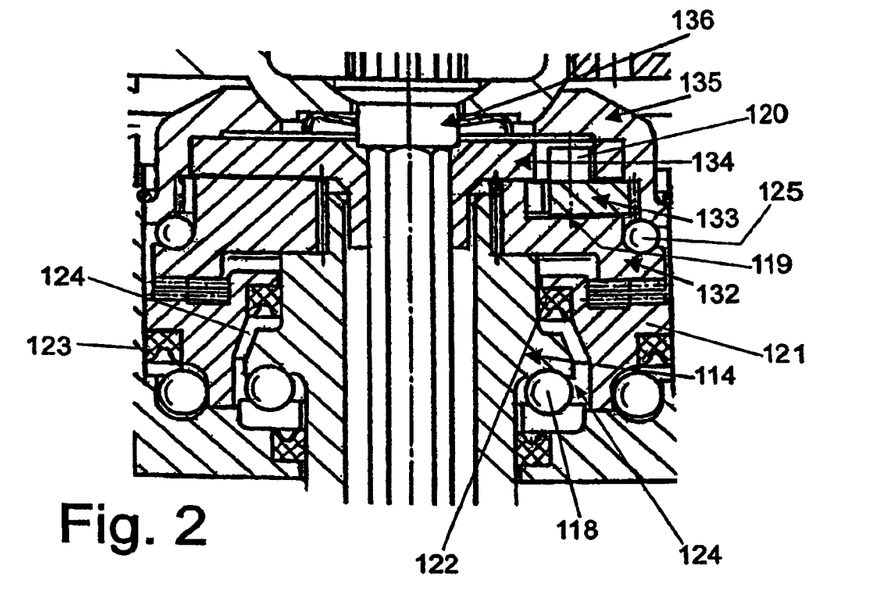
FIG. 2 shows a detailed view from FIG. 1.
Figure 3:
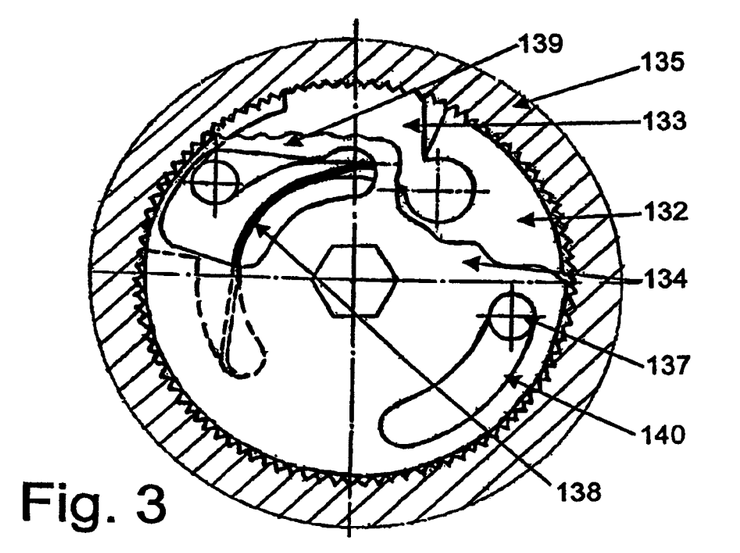
FIGS. 3 to 6 are partly cut-away illustrations of elements of a manually actuable release device of the compact brake cylinder from FIGS. 1 and 2 in different operating states.

The brake cylinder 100, which is shown in FIGS. 1 to 3, has a housing 101 which is cup-shaped and preferably substantially cylindrical. The housing 101 is closed at one of its ends by a cover 102, which is provided with at least one or more compressed air connections 103. A piston 104 having a piston sealing ring 105 is arranged in the cup-shaped housing 101, the diameter of the piston 104 together with the piston sealing ring 105 corresponding to the internal diameter of the housing 101. The piston 104 can be loaded through the compressed air connection 103 with compressed air, which can also flow out through the connection.

As FIG. 1 shows, the piston 104 is countersunk in its central region, with the result that a pressure space 106 is produced. A further space 107 is delimited by the piston 104, into which further space 107 a conical return spring 108 and a spring force accumulator spring 109 are inserted. The spring force accumulator spring 109 is placed between the piston 104 and a spring force accumulator piston 110 in the manner of a spring cup, the diameter of which is smaller than the internal diameter of the housing. The return spring 108 is placed between that side of the spring force accumulator piston 110 which faces away from the spring force accumulator and the inner end region of the housing 101 which faces away from the cover.

On its internal circumference, the spring force accumulator piston 110 rests on a collar 111 of a piston rod 112. The piston rod 112 penetrates an opening 113, which is formed in the housing 101 on the end of the housing 101 facing away from the cover 102. The piston rod 112 serves to actuate an application apparatus of a brake.

A pneumatically actuable locking mechanism 116 is accommodated in a central receiving space 117 of the piston 104 on that side of the piston 104 which faces the cover 102. The piston 104 receives the locking mechanism 116.

The piston rod 112 is of sleeve-shaped design and is provided with an internal thread, into which a threaded spindle 114 (provided with an external thread) engages. The threaded spindle 114 is not of a self-locking design. It is preferably coupled at one of its ends directly or via intermediate elements to the pneumatically actuable locking mechanism 116, which is configured here in the form of a pneumatically actuable clutch or brake. In the exemplary embodiment which is shown, the locking mechanism is configured as a positively engaging clutch 116.

Here, the clutch 116 is formed in an advantageous and compact way between a locking mechanism piston 121 and the axial faces of a bearing plate 132 (explained below) and is coupled to the threaded spindle 114 in a rotationally fixed manner.

On its internal and its external circumference, the locking mechanism piston 121 is sealed by way of piston ring seals 122, 123 with respect to the threaded spindle 114 and the receiving space 117.

The locking mechanism piston 121 can be loaded with compressed air via a pressure space 124 and via a compressed air line (in a manner which is not shown here), as a result of which the clutch 116 can be brought into engagement. The threaded spindle 114 is correspondingly prevented from rotating by loading the pressure space 124 below the locking mechanism piston 121 with compressed air, with the result that the PBS brake can be set out of operation. The threaded spindle 114 is supported on the piston 104 via rolling bodies 118.

In the position on the left of FIG. 1, the clutch 116 is closed and the pneumatically actuable locking apparatus is activated, with the result that the threaded spindle 114 is secured against rotating.

If the spring force accumulator piston 110 is then to be transferred into the parking brake position, which is shown in the illustration on the right of FIG. 1, the force which is guided into the clutch 116 from the locking mechanism piston 121 is reduced by a pressure drop in the space 124, with the result that the force which is applied by the spring force accumulator spring 109 brings about a situation where the threaded spindle 114 rotates, the spring force accumulator piston 110 being displaced with the piston rod 112 in the braking position.

The rotational speed can be regulated by the brake force of the clutch 116, with the result that the linear movement of the spring force accumulator piston 110 can also be controlled.

In order to release the braking position, the pressure space 106 is loaded with pressure in accordance with the preceding embodiment. Since the parking brake piston 121 is now pressureless, the threaded spindle 114 can be rotated and the spring force accumulator piston 110 is moved back into the initial position counter to the action of the spring force accumulator spring 109.

In the case of service brake operations, the clutch 116 remains in the braking position, with the result that the two pistons 104, 110 are moved jointly into the braking position, without changing their relative position with respect to one another. The action of the spring force accumulator spring 109 cannot be developed in this state. An analogous situation is valid for the release of the brake after service brake operations.

In the case of the compact combined cylinder 100, the function of the parking brake cylinder is integrated into the service brake cylinder. Here, the spring force accumulator spring 109 is no longer actuated via a separate spring force accumulator piston, but rather via the piston 104 of the service brake cylinder. In order to release the parking brake, the SBS piston is loaded for a short time period by means of a special actuation with compressed air.

As described in the preceding text, the parking brake or the parking brake section is released as a rule with the aid of compressed air. In addition, however, it is also possible according to the invention to release the parking brake section manually by way of a manually actuable release device in the case of a pressure loss. To this end, in the case of conventional combined cylinders, the spring is pulled back with the aid of a threaded spindle (of what is known as the release spindle). The function of the service brake cylinder is not impaired as a result.

In the case of the compact combined cylinder, this cannot be realized in such a simple way, since the SBS piston and the spring force accumulator spring are connected to one another. If the spring force accumulator spring 109 were pulled back by a threaded spindle which is accessible from the outside, the SBS piston would also be blocked and, as a consequence, there would also no longer be the function of the SBS cylinder.

A manually actuable release device is therefore advantageous for manually releasing the spring force accumulator spring, which manually actuable release device makes it possible to cancel the spring force accumulator action in the case of pressure loss, without impairing the SBS function. Furthermore, it is to be possible to reestablish the PBS action after the release operation by a manual operation. This is achieved by the fact that the manually actuable release device is assigned a likewise manually actuable locking apparatus. The locking apparatus, which is shown in the drawings and will be described in greater detail, is based on a ratchet mechanism.

The ratchet mechanism has a bearing plate 132, which is coupled in a rotationally fixed manner to the threaded spindle 114 or is integrally configured with the latter. The threaded spindle 114 is supported on a cup disk 135 by way of rolling bodies 125 and can be rotated relative to the locking apparatus depending on the functional position of the latter which acts between these two elements 132, 135. The bearing plate 132 has a recess 119 for a locking pawl 133 and a peg 137, which serves for torque transmission. The locking pawl 133 is inserted rotatably into the bearing plate 132, is connected to the disk cam 134 by an integrally formed pin 120 and is pressed radially to the outside by a leaf spring 138.

Furthermore, the ratchet mechanism includes a disk cam 134 with a control contour 139, an arcuate slot 140 and a centrally arranged hexagonal aperture. The control contour 139 serves for switching the locking pawl 133 on and off. In contrast, the arcuate slot 140 serves, above a defined angular travel, to transmit the torque to the bearing plate 132. The hexagon socket serves to introduce the torque into the disk cam 134. A profiled actuating mandrel 136 serves to introduce the manually applied torque. Furthermore, it serves to switch the mechanism on and off. The actuating mandrel 136 is mounted rotatably and pivotably in the housing 101 of the brake cylinder.

Furthermore, the ratchet mechanism includes the cup disk 135 having an internal toothing system, which is in engagement with the locking pawl 133 having a corresponding toothing system in the case of the manual release operation. The cup disk 135 is supported on the piston 104 and cannot be rotated relative to the latter. Since it is a positively engaging ratchet mechanism, reliable and slip-free locking of the spring force accumulator spring is ensured.

The function of this arrangement is as follows. In the case of the manual release of the spring force accumulator spring 109, the threaded spindle 114 has to be turned back with the aid of a wrench. Here, the torque is transmitted via the actuating mandrel 136 into the disk cam 134. As a result of the rotation of the disk cam 134 relative to the bearing plate 132, the locking pawl 133 is released by the control contour 139 for engagement into the toothing system of the cup disk 135. Here, the locking pawl 133 is pressed elastically by the leaf spring 138 against the internal toothing system of the rotationally fixed cup disk 135. At the same time, after rotating past the control angle, the torque is transmitted via the arcuate slot 140 and a corresponding peg 137 in the bearing plate 132, from the disk cam 134 into the bearing plate 132 and from there into the threaded spindle 114.

Since, on account of the direction-dependent locking action, the locking pawl 133 prevents automatic turning back of the threaded spindle 114, the wrench can be turned without the threaded spindle 114 being turned back. This operation can be repeated until the spring force accumulator spring has reached the release position for the parking brake.

If the spring force accumulator spring is to be moved from the position "spring force accumulator released" manually into the position "spring force accumulator engaged", a rotational movement in the locking direction of the ratchet mechanism has to be carried out by way of the wrench. Here, first of all, the disk cam 134 is rotated relative to the bearing plate 132 until the locking pawl 133 is pulled out of the internal toothing system of the cup disk 135 by the control contour 139. As soon as this state is reached, the threaded spindle 114 can be rotated.

Figure 5:
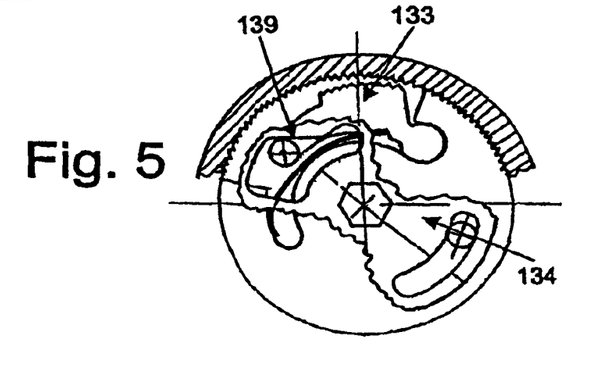

FIG. 5 shows a manual application of this type of the spring force accumulator brake. In this figure, the disk cam 134 is rotated to the left, as a result of which the locking pawl 133 is pulled out of the toothing system via the contour 139. As a result, the bearing plate 132 can be rotated as far as the next latching of the locking pawl 133.

Since the threaded spindle 114 moves more quickly than the disk cam 134 which is guided by the wrench, a relative movement occurs between the bearing plate 132 and the disk cam 134 and, as a consequence, the locking pawl 133 latches again in the internal toothing system of the rotationally fixed cup disk 135. This ensures that the threaded spindle 114 is rotated only so far and as quickly as is predefined by the rotational movement of the wrench.

To this end, it is necessary to rotate the actuating mandrel 136 with the aid of a wrench in the direction of "engage spring force accumulator brake" until a further rotation is no longer possible. This achieves a situation where the disk cam 134 is rotated relative to the bearing plate 132 and the switching pin of the locking pawl 133 is moved into a latching position on the control contour 139.

Figure 6:
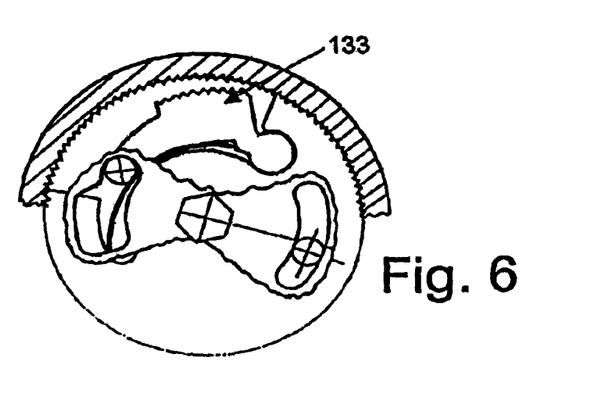

FIG. 6 shows the manual release device in its deactivated position. The locking pawl 133 remains in its rest position.

Figure 4:
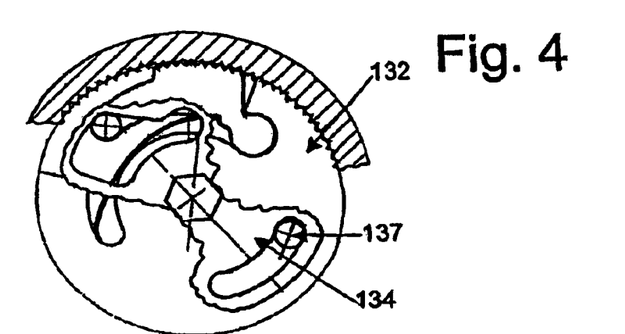

FIG. 4 shows the locking position of the free wheel. The bearing plate 132 is rotated to the right by the disk cam 134 via the pin 137. The bearing plate 132 cannot rotate automatically to the left in this position.

During the manual release operation, the actuating mandrel 136 is in contact with the manual rotating apparatus 127 for attaching an actuating tool, in particular a wrench. The rotating apparatus 127 is designed in such a way that, for example while being turned back, that is to say, releasing of the spring force accumulator, an outer sleeve 128 follows a travel (stroke) in the axial direction as a result of a special shape, until an introduction of torque is possible.

This axial stroke results in a graduation on the end side between the outer sleeve 128 and an inner pin 129. On account of this clear contour change, the manual release state of the spring force accumulator brake can be visually detected or sensed.

Since the threaded spindle 114 has a quick-action thread which is not self-locking, first of all, during closing of the spring force accumulator, that is to say during manual engagement of the spring force accumulator brake, a torque is exerted on the wrench until the expansion of the spring force accumulator spring 109 comes to a standstill as a result of the counterforce of the brake lever. If the spring force accumulator spring 109 is then turned further in the application direction by way of the wrench, the outer sleeve 128 is moved out of the stable "release position" into the normal position (spring force accumulator free) and the end-side gradation is canceled.

In the following text, the realized concept for actuating the compact combined cylinder will be described in greater detail. Here, an electronic controller is preferably avoided, in order to ensure functioning which is independent of the vehicle electrical system.

Figure 7:
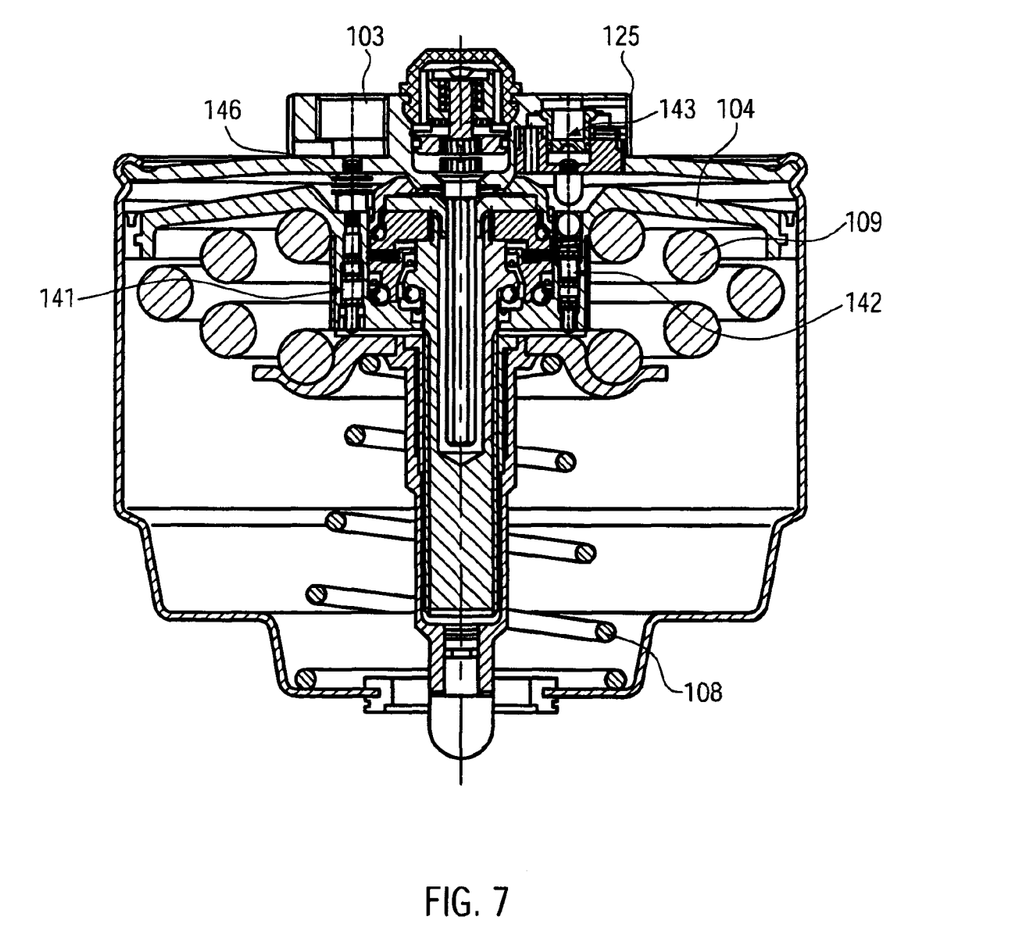
FIG. 7 shows a brake cylinder of the type of FIG. 1 which is supplemented by pneumatic functional elements such as valves.

FIG. 7 shows a variant of the brake cylinder from FIG. 1 having a further compressed air connection 125 and further details, in particular of elements which serve to actuate the brake cylinder. This actuation is based on logical linking of pneumatic control valves. Since there is no dedicated release piston which is independent of the SBS for the spring force accumulator spring 109, the (SBS) piston 104 has to be loaded with compressed air for a brief period, in order that the spring force accumulator spring 109 can be moved into the "PBS released" position and can be subsequently locked.

This loading with compressed air takes place by way of the compressed air connection 103. As a result of the subsequent ventilation of the SBS feed line, the piston 104 is moved with the compressed spring force accumulator spring 109 into the rest position with the aid of the restoring spring 108, and the spring force accumulator brake is released.

This functional sequence can be realized on the basis of a circuit in accordance with the appended figures. The basic concept of this connection is a controller which does not operate as a function of time but rather as a function of position. In order to achieve this, it is necessary to detect the position of the spring force accumulator spring 109 with respect to the cylinder piston. To this end, at least one or more control valves is/are arranged on the cylinder piston.

Figure 8:
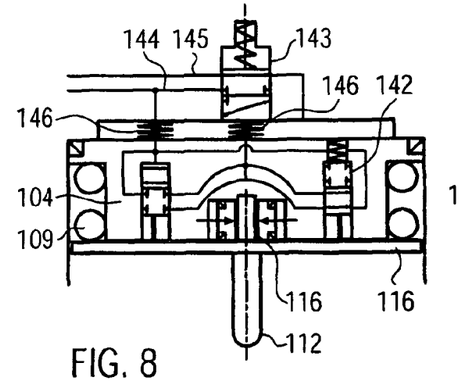
FIGS. 8-11 are illustrations in the manner of circuit diagrams of the linking of functional elements of the brake cylinder from FIG. 7 in different operating states.

The exemplary embodiment of FIGS. 7 and 8 has the following valves:

(1) a first mechanically actuated 4/2-way valve 141, which is arranged on the (cylinder) piston 104 or is integrated into the latter, with a locking function in the actuated state;

(2) a second mechanically actuated 4/2-way valve 142, which is placed on the (cylinder) piston, with a pass-through function in the actuated state; and (3) a pneumatically actuated 3/2-way valve 143, which is integrated into the cylinder body for switching over with regard to loading with compressed air of the cylinder piston from a connected PBS circuit (line 144) or a connected SBS circuit (line 145).

The 3/2-way valve 143 is connected to the lines 144, 145 and, by way of example in the manner of FIG. 8, firstly to the valve 141 and secondly to the valves 141 and 142. The valve 141 is likewise connected to the PBS line 144. The valves 141 and 142 are connected to one another in the manner of FIG. 8 and are in turn connected to the locking mechanism 116 and are therefore designed in interaction for loading the pressure space 124 with compressed air and for reducing the pressure in this space, with the result that the locking mechanism 116 can be released and arrested by way of them. The valves which can be moved with the cylinder piston are preferably supplied with compressed air by way of flexible connecting lines 146.

Figure 12:
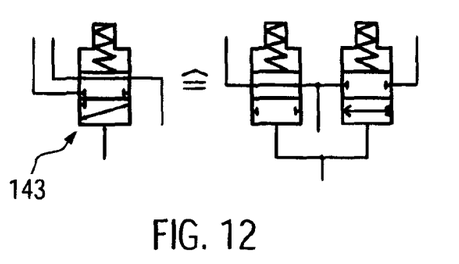
FIGS. 12 and 13 are alternative refinements of components from FIG. 8.
Figure 13A:
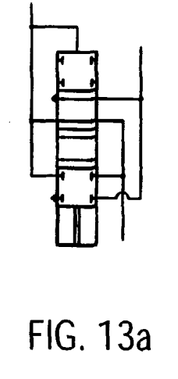
Figure 13B:
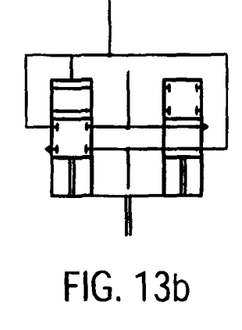
Figure 13C:
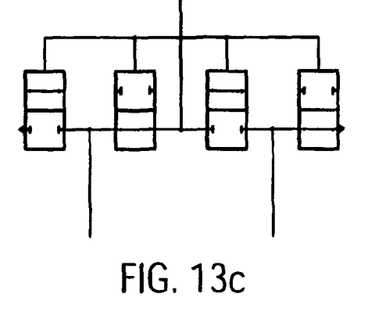

In principle, of course, the function can be distributed to more or fewer valves. FIGS. 12 and 13 diagrammatically show some more variants. FIG. 12 shows a valve arrangement which replaces the function of the 3/2-way valve 143, and FIGS. 13a to c show alternative valve arrangements which are designed to replace the function of the 3/2-way valves 141 and/or 142.

Figure 14:
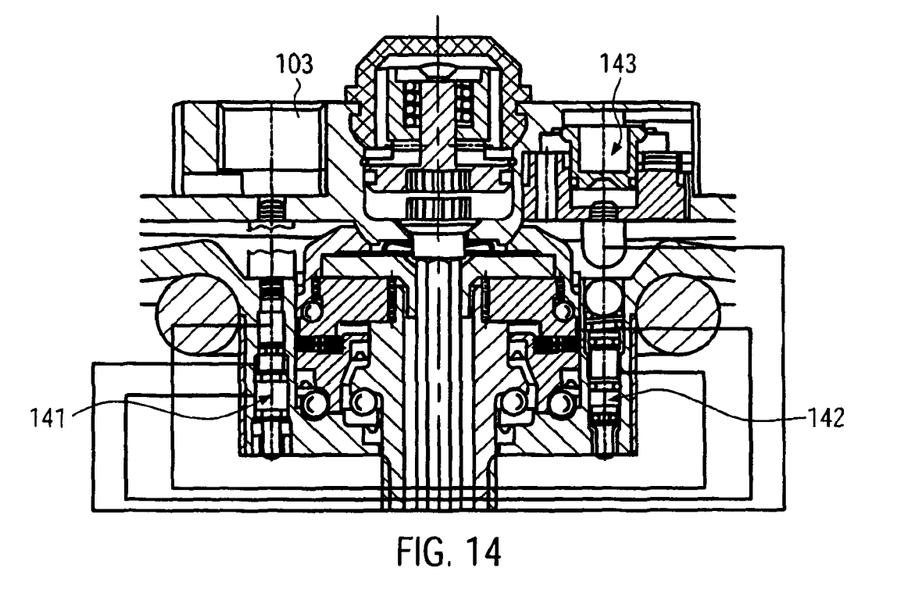
FIG. 14 shows an enlarged detail from FIG. 7.

In the following text, the function of the arrangement from FIGS. 7, 8 et seq. and 14 is to be described in greater detail.

FIG. 8 corresponds to the released position of the spring force accumulator. The switchover valve 143 is not actuated in the "spring force accumulator released" position, since the control line is ventilated via pneumatic valve 142 and the restoring spring can therefore switch the pneumatic valve to pass-through SBS and shutoff PBS. A braking operation by way of the SBS is therefore possible without impediment.

The pressure which prevails in the PBS circuit is forwarded via the flexible compressed air connection 146 to the control valves 141 and 142, which are seated on the cylinder piston 104. The pneumatic valve 141 is set to "shut" and the pneumatic valve 142 is set to "open" by the spring collar and the spring force accumulator piston 110 which acts on the valves 141 and 142 in the released state of the PBS brake. The pressure can therefore be guided via the pneumatic valve "142" from the PBS circuit to the mechanism for the PBS spring arresting means. The valves 141 and 142 have piston rods which project out of the piston 104 in the direction of the spring force accumulator piston 110 and can be pushed by the latter into the piston 104, as a result of which their functional position can be changed as a function of the location of the spring force accumulator piston 110 relative to the piston 104.

Figure 9:
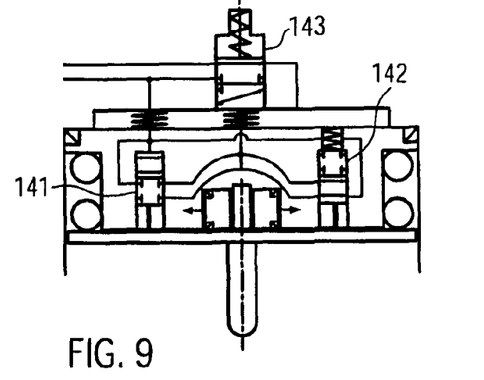

In order to engage the spring force accumulator PBS (FIG. 9), the PBS feed line 144 is ventilated via a parking brake valve known per se of the brake controller (not shown here) and the mechanism for the PBS spring arresting means is released. The spring force accumulator spring 109 can therefore expand and exert a force on the brake lever (not shown here).

Figure 10:
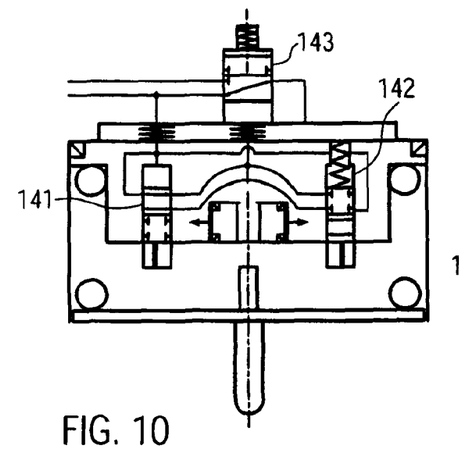
Figure 11:
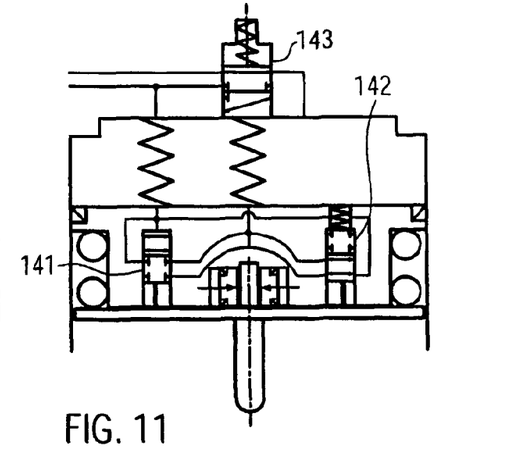

The release of the parking brake can be seen from the interaction of FIG. 10, FIG. 11 and FIG. 8. Since the spring force accumulator spring 109 is expanded, the control valves 141 and 142 are not actuated by the spring collar or spring force accumulator piston 110. Pressure is built up via the PBS feed line 144. The control valve 141 is therefore switched to pass-through. The control valve 142 is set to "shut" by the restoring spring 108. The switchover valve 143 is then actuated via the control valve 141 and is switched in such a way that the pressure out of the PBS feed line 144 can load the cylinder piston. The spring force accumulator spring 109 is then compressed by the cylinder piston 104 until the spring collar 110 has reached the initial position.

In this position, the control valves 141 and 142 are actuated by the spring collar or spring force accumulator piston 110 and are switched to shutoff (valve 141) and pass-through (valve 142). As a result, firstly the control line of the switchover valve 143 is ventilated via the control valve 142 and secondly the spring arresting mechanism is supplied with compressed air, likewise via the control valve 142.

The cylinder piston 104 which is ventilated via the switchover valve 143 and the ventilated SBS feed line 145 can then be returned with the spring force accumulator spring 109, which is arrested in the "released" position, into the rest position via the restoring spring 108.

| Table of Reference Numbers | |
|---|---|
| Compact brake cylinder | 100 |
| Housing | 101 |
| Cover | 102 |
| Compressed air connections | 103 |
| Piston | 104 |
| Circumferential sealing ring | 105 |
| Pressure space | 106 |
| Space | 107 |
| Return spring | 108 |
| Spring force accumulator spring | 109 |
| Spring force accumulator piston | 110 |
| Collar | 111 |
| Piston rod | 112 |
| Opening | 113 |
| Threaded spindle | 114 |
| Locking mechanism | 116 |
| Receiving space | 117 |
| Rolling bodies | 118 |
| Recess | 119 |
| Pin | 120 |
| Locking mechanism piston | 121 |
| Piston seals | 122, 123 |
| Pressure space | 124 |
| Rolling body | 125 |
| Rotating apparatus | 127 |
| Sleeve | 128 |
| Pin | 129 |
| Bearing plate | 132 |
| Locking pawl | 133 |
| Disk cam | 134 |
| Cup disk | 135 |
| Actuating mandrel | 136 |
| Peg | 137 |
| Leaf spring | 138 |

| Table of Reference Numbers | |
|---|---|
| Control contour | 139 |
| Slot | 140 |
| 4/2-Way valve | 141 |
| 4/2-Way valve | 142 |
| 3/2-Way valve | 143 |
| PBS line | 144 |
| SBS line | 145 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:
    a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;
    a first piston dividing the housing into two spaces, of which one of the two spaces serves as pressure space for actuating the service brake section, the spring force accumulator spring of the spring force accumulator section being arranged in the other space on an opposite side of the first piston;
    a pneumatically actuable locking mechanism, the spring force accumulator spring acting in the other space on the opposite side of the first piston from the service brake pressure space on a further spring force accumulator piston which is lockable with respect to the first piston by the locking mechanism, and is first releaseable by a release action of the locking mechanism, the spring force accumulator piston being connected directly or via further elements to a piston rod for actuating the vehicle brake;
    wherein, after release of the locking mechanism,
        the spring force accumulator spring acts between the two pistons and displaces them relative to one another in the case of a parking brake operation; and
        at least one pneumatic valve, which is actuated as a function of a location of the accumulator spring in the case of braking operations, is integrated into the brake cylinder in order to actuate the brake cylinder.

2. The brake cylinder as claimed in claim 1, wherein at least one of the at least one pneumatic valves is provided for actuation of the locking mechanism of the brake cylinder.

3. The brake cylinder as claimed in claim 1, wherein, for actuation, all of the at least one pneumatic valves are only purely pneumatically/mechanically actuable valves, whereby different operating situations are realizable even without a pneumatic supply of the cylinder.

4. The brake cylinder as claimed in claim 1, wherein the spring force accumulator piston, which is loaded by the spring force accumulator spring, is in engagement with a threaded spindle operatively connected to a brake or clutch forming the pneumatically actuable locking mechanism;
    wherein the threaded spindle is secured against rotation in a release state of the brake cylinder; and wherein the threaded spindle is capable of rotation as a result of reduction or cancelation of the engagement of the brake or clutch, whereby the spring force accumulator piston is movable in a longitudinal direction of the threaded spindle upon relieving the spring force accumulator spring.

5. The brake cylinder as claimed in claim 1, wherein all of the at least one pneumatic valves are integrated into the brake cylinder, said pneumatic valves being designed to be moved into different operating states as a function of position of the spring force accumulator spring.

6. The brake cylinder as claimed in claim 1, wherein at least one of the at least one pneumatic valves is integrated directly into the first piston, said at least one of the at least one pneumatic valves being designed to be moved into different operating states as a function of a position of the spring force accumulator spring.

7. The brake cylinder as claimed in claim 1, wherein a parking brake circuit compressed air line and a service brake circuit compressed air line are connectable to the brake cylinder.

8. The brake cylinder as claimed in claim 1, wherein the at least one pneumatic valves include:
   a first mechanically operated 4/2-way valve having a locking function in an actuated state;
   a second mechanically actuated 4/2-way valve placed on the piston and having a pass-through function in the actuated state; and
   a pneumatically actuated 3/2-way valve which is integrated into the cylinder body for switching over with regard to loading with compressed air of the cylinder piston from a connected parking brake circuit or a connected service brake circuit.

9. The brake cylinder as claimed in claim 1, wherein at least one or more flexible connecting lines for supplying compressed air to the at least one pneumatic valve are movable with the first piston.

10. The brake cylinder as claimed in claim 1, wherein, in addition to the pneumatically actuable locking mechanism, the brake cylinder has a manually actuable release device for manually releasing the spring force accumulator brake section without impairing service brake section functionality.

11. A method for actuating a brake cylinder for a pneumatically actuated vehicle brake in a commercial vehicle, including:
   a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit,
   a first piston dividing the housing into two spaces, of which one of the two spaces serves as pressure space for actuating the service brake section, the spring force accumulator spring of the spring force accumulator section being arranged in the other space on an opposite side of the piston,
   a pneumatically actuable locking mechanism, the spring force accumulator spring acting in the space on a further spring force accumulator piston which is lockable with respect to the first piston by the locking mechanism, and is first releaseable by a release action of the locking mechanism, the spring force accumulator piston being connected directly or via further elements to a piston rod for actuating the vehicle brake,
   wherein, after release of the locking mechanism, the spring force accumulator spring acts between the two pistons and displaces them relative to one another in the case of a parking brake operation, the method comprising the acts of:
      actuating the brake cylinder via pneumatic valves integrated into the brake cylinder; and
      moving the pneumatic valves into different operating states for the actuation as a function of a position of the spring force accumulator spring.

* * * * *